(12) United States Patent
Zhu et al.

(10) Patent No.: US 8,827,084 B2
(45) Date of Patent: Sep. 9, 2014

(54) FILTER ELEMENT OF A LIQUID FILTER AND A LIQUID FILTER

(75) Inventors: Yihao Zhu, Ludwigsburg (DE); Rainer Loos, Freiberg (DE); Bernd Nageldinger, Asperg (DE); Holger Schwarz, Muenster (DE); Norbert Strassenberger, Adlkofen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 230 days.

(21) Appl. No.: 13/363,875

(22) Filed: Feb. 1, 2012

(65) Prior Publication Data

US 2012/0193281 A1     Aug. 2, 2012

(30) Foreign Application Priority Data

Feb. 1, 2011 (DE) .......................... 10 2011 010 076

(51) Int. Cl.
| | |
|---|---|
| *B01D 29/11* | (2006.01) |
| *B01D 29/15* | (2006.01) |
| *B01D 29/21* | (2006.01) |
| *B01D 29/07* | (2006.01) |

(52) U.S. Cl.
CPC .......... *B01D 29/11* (2013.01); *B01D 2201/295* (2013.01); *B01D 2201/34* (2013.01)
USPC ........... 210/450; 210/435; 210/437; 210/440; 210/443; 210/445; 210/451; 210/453; 210/457; 210/493.1; 210/493.2

(58) Field of Classification Search
CPC ............. B01D 27/08; B01D 2201/291; B01D 2201/295; B01D 2201/304; B01D 2201/34; B01D 2201/342
See application file for complete search history.

(56) References Cited

U.S. PATENT DOCUMENTS

| | | | |
|---|---|---|---|
| 2007/0170103 A1* | 7/2007 | Fick ............................. | 210/232 |
| 2009/0008322 A1* | 1/2009 | Sakraschinsky ............. | 210/442 |
| 2010/0294711 A1* | 11/2010 | Sakraschinsky et al. ..... | 210/453 |
| 2012/0152199 A1* | 6/2012 | Thienel ..................... | 123/195 C |

FOREIGN PATENT DOCUMENTS

| | | |
|---|---|---|
| DE | 29704360 U1 | 6/1997 |
| DE | 10259900 A1 | 7/2004 |
| DE | 202006017614 U1 | 4/2008 |
| DE | 202006018334 U1 | 4/2008 |
| DE | 102009015094 A1 | 10/2010 |
| WO | WO2008130808 A1 | 10/2008 |
| WO | WO 2010/149728 * 12/2010 ............. B01D 27/00 |

OTHER PUBLICATIONS

DPMA Office Action of DE 102011010076.8.

* cited by examiner

*Primary Examiner* — Benjamin Kurtz
(74) *Attorney, Agent, or Firm* — James Hasselbeck

(57) ABSTRACT

A filter element for a liquid filter is arranged in the liquid filter housing that has at least two housing parts such that an inlet of the housing for liquid to be filtered is separated from an outlet of the housing for filtered liquid. The filter element has a filter medium provided with a terminal disk. The terminal disk has a seal support for an outer radial annular seal that is to be clamped in a clamping area between the housing parts that are separable from each other. The seal support of the filter element has axially at least a base member and a cover member. The base member is fixedly connected to the terminal disk. The cover member is attached to the terminal disk, to the base member, or to terminal disk and base member. The annular seal is positioned between base member and cover member.

8 Claims, 3 Drawing Sheets

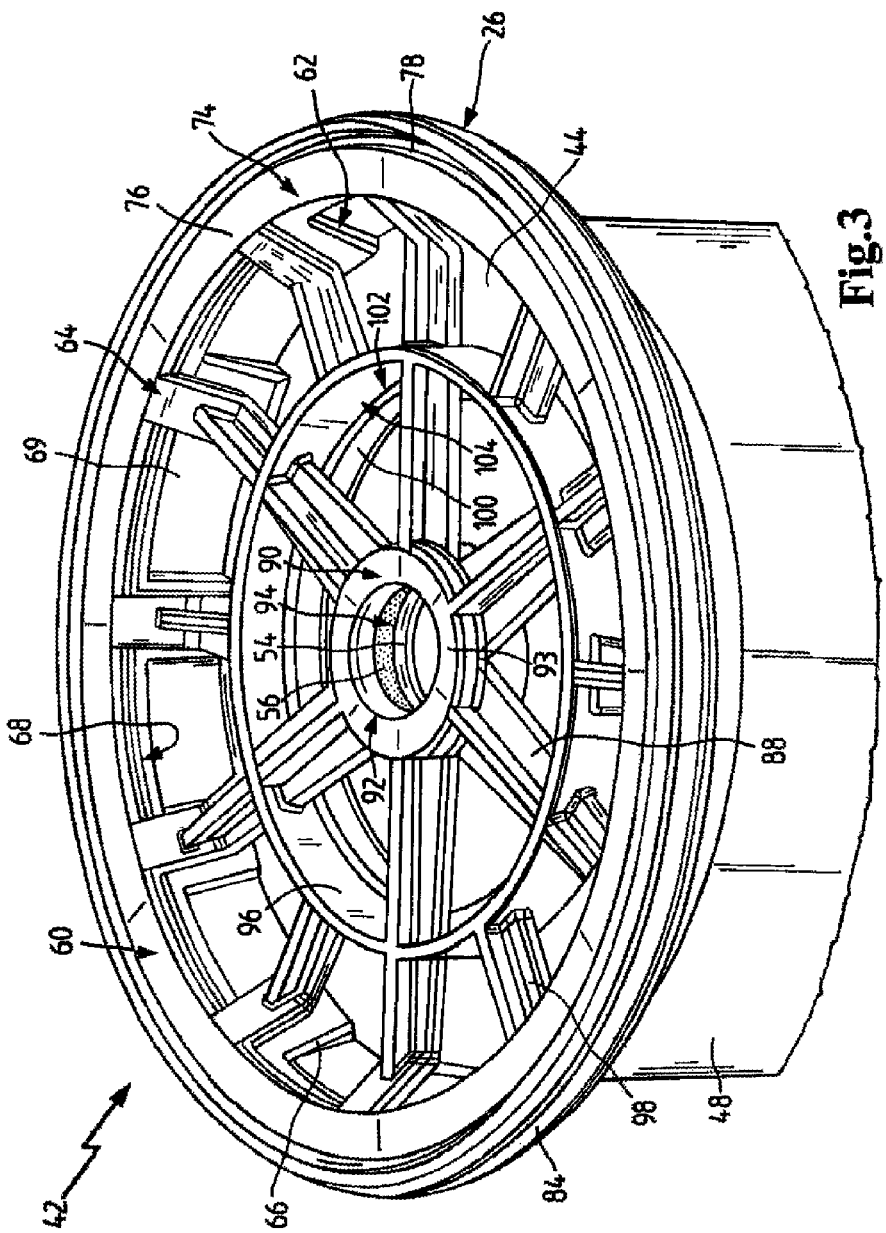

US 8,827,084 B2

FILTER ELEMENT OF A LIQUID FILTER AND A LIQUID FILTER

CROSS REFERENCE TO RELATED APPLICATIONS

This application claims the benefit under 35 USC 119 of foreign application DE 102011010076.8 filed in Germany on Feb. 1, 2011, and which is hereby incorporated by reference in its entirety.

TECHNICAL FIELD

The invention concerns a filter element for a liquid filter, in particular for fuel, oil or water, in particular of an internal combustion engine and especially of a motor vehicle.

BACKGROUND OF THE INVENTION

A liquid filter, in particular for fuel, oil or water, in particular of an internal combustion engine and especially of a motor vehicle, may be arranged in a filter housing. The housing may have at least two parts and the filter element is positioned therein in such a way that it separates at least one inlet of the housing for the liquid to be filtered from an outlet of the housing for the filtered liquid. The filter element includes a filter medium and may include at least one terminal disk that is connected to the filter medium with a seal support for an outer radial annular seal that can be clamped in a clamping area between the two housing parts of the housing that can be separated from each other.

In a certain known liquid filters, a zigzag-folded filter medium is arranged between two terminal disks. One of the two terminal disks has at the outer radial rim a seal support that is provided with a groove open outwardly in radial direction for receiving an annular seal made of an elastomer. The annular seal is clamped between two housing parts of the filter housing and seals thus the areas between the filter housing and the filter system. For mounting, the annular seal must be inserted into the securing groove in radial direction from the exterior. For this purpose, the annular seal must be stretched somewhat.

It is therefore an object of the present invention to design a filter element and a liquid filter of the aforementioned kind in such a way that the annular seal can be mounted as easily as possible on the seal support. Moreover, the annular seal should be embodied with a minimal material expenditure.

SUMMARY OF THE INVENTION

In accordance with the present invention, this is achieved in that the seal support in axial direction is at least of a two-part configuration and comprises a base member that is connected fixedly to the terminal disk and further comprises a cover member that is attached to the terminal disk and/or to the base member, wherein the annular seal is inserted or positioned between the base member and the cover member.

In the inventive disclosure herein, the terms axial and radial relate to an imaginary rotation and/or insertion axis of the liquid filter: in the direction of the axis in which the filter element is inserted into the housing and removed from the housing.

According to the invention, a base member of the seal support is fixedly connected to the terminal disk. Onto this base member, the annular seal is simply placed in axial direction without this requiring stretching or threading of the annular seal as is the case in known liquid filters. The cover member is placed in axial direction onto the base member and is secured on the terminal disk and/or the base member such that the annular seal is held in place between the base member and the cover member. The axial installation of the annular seal in the axial direction makes it possible to be flexible with respect to shape variants of the annular seal. In particular, a securing section of the annular seal that is secured between the cover member and the base member can have a minimal extension in the axial direction so that less material is needed for the annular seal.

In an advantageous embodiment, the base member can have a base member securing ring profile with a base member securing section that faces the cover member. The cover member can have a cover member securing ring profile with a cover member securing section that is facing the base member. The base member securing section and the cover member securing section can engage the securing section of the annular seal like pliers. With the pliers engagement the annular seal is optimally secured and fixed within the base member and the cover member. Advantageously, the securing section can be designed such that it is reduced in cross section at the location where the base member securing section and the cover member securing section engage it. In this way, it is prevented that the securing section can slide in radial direction or can even slip out of the pliers engagement outwardly in the radial direction. Since the annular seal is placed in axial direction onto the base member, the extension of the securing section of the annular seal in the radial direction can be selected to be greater than in case of the liquid filters of the prior art in which the annular seal must be stretched in order to be able to insert it radially from the exterior into the securing groove. An overlap of the securing section with the seal support in the radial direction can be selected to be correspondingly larger so that, in turn, the securing section, while provided with the same loadability, can be correspondingly thinner in axial direction; in this way, less material must be used. Advantageously, the spacing between the base member securing section and the cover member securing section and the axial extension of the securing section can be matched to each other such that the annular seal in the circumferential direction can move within certain limits. In this way, movements of the filter element, in particular as a result of pressure fluctuations in the housing, can be compensated. Moreover, with the positional tolerances of the annular seal achieved in this way the installation of the filter element in the housing is simplified.

Advantageously, the cover member securing ring profile can be connected by connecting sections, arranged like spokes of a wheel, with an inner radial fastening ring section that, for fastening the cover member, is attached to the terminal disk and/or the base member. With the fastening ring section, the cover member can be fixedly connected in a simple way with the terminal disk and/or the base member. The spoke arrangement of the connecting sections is stable but still elastic so that in particular movements of the filter element caused by pressure fluctuations in the liquid filter can be compensated in a simple way in the housing. Moreover, liquid can pass without pressure loss through the connecting sections. Incidentally, the spoke arrangement can be optimized with respect to material and weight.

Advantageously, the cover member can be provided between the cover member securing ring profile and the fastening ring section with at least one, in particular annular, support section for supporting the connecting sections with respect to the terminal disk. With the support section the cover member is supported in axial direction and is stabilized with respect to shape and position. The support section can be secured advantageously on the terminal disk so that the stability of the connection of the cover member with the terminal disk is improved. Such an additional fixation of the cover member on the terminal disk has moreover the advantage that the pliers-type engagement of the annular seal by the base member securing section and the cover member securing section is improved. The pressing force that acts upon the pliers-type engagement on the securing section of the annular seal can thus be defined in a better way. The spacing of the base member securing section and of the cover member securing section can be kept constant more easily so that the securing section for an optimally predetermined pressing force cannot slip out of said engagement.

In a further advantageous embodiment, the cover member, in particular the fastening ring section, can form at least partially a receptacle for an inner radial annular seal. Advantageously, the fastening ring section can have a cover section that delimits a receptacle for the inner radial annular seal in a corresponding socket of the terminal disk or the base member in axial direction. This has the advantage that even the inner radial annular seal can be inserted, without being deformed, into the receptacle in axial direction so as to be secured therein after attachment of the cover member.

Advantageously, the cover member can be attached by means of a snap connection, a rotation and/or insertion connection, in particular a screw connection or bayonet connection, an adhesive connection or a weld connection to the terminal disk and/or the base member. A snap connection and a rotation and/or insertion connection can be effected in a simple way without requiring tools. A snap connection can moreover be designed such that, when assembling the components, no attention must be paid with respect to their orientation relative to each other. Rotation and/or insertion connections are stable and can be easily released. Adhesive connections or weld connections are robust for long periods of time. The requirements with respect to shape of the connecting surfaces are lower for adhesive connections or weld connections as compared to snap connection and rotation and/or insertion connections.

The object is solved further with the liquid filter according to the invention in that the seal support in axial direction is at least of a two-part configuration and comprises a base member that is connected fixedly to the terminal disk and further comprises a cover member that is attached to the terminal disk and/or to the base member, wherein the annular seal is inserted or positioned between the base member and the cover member. The features and advantages disclosed above in connection with the filter element according to the invention apply also to the liquid filter.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 3 shows schematically an isometric illustration of the filter element of FIG. 2.

In the Figures, same components are identified with same reference characters.

Figure 1:
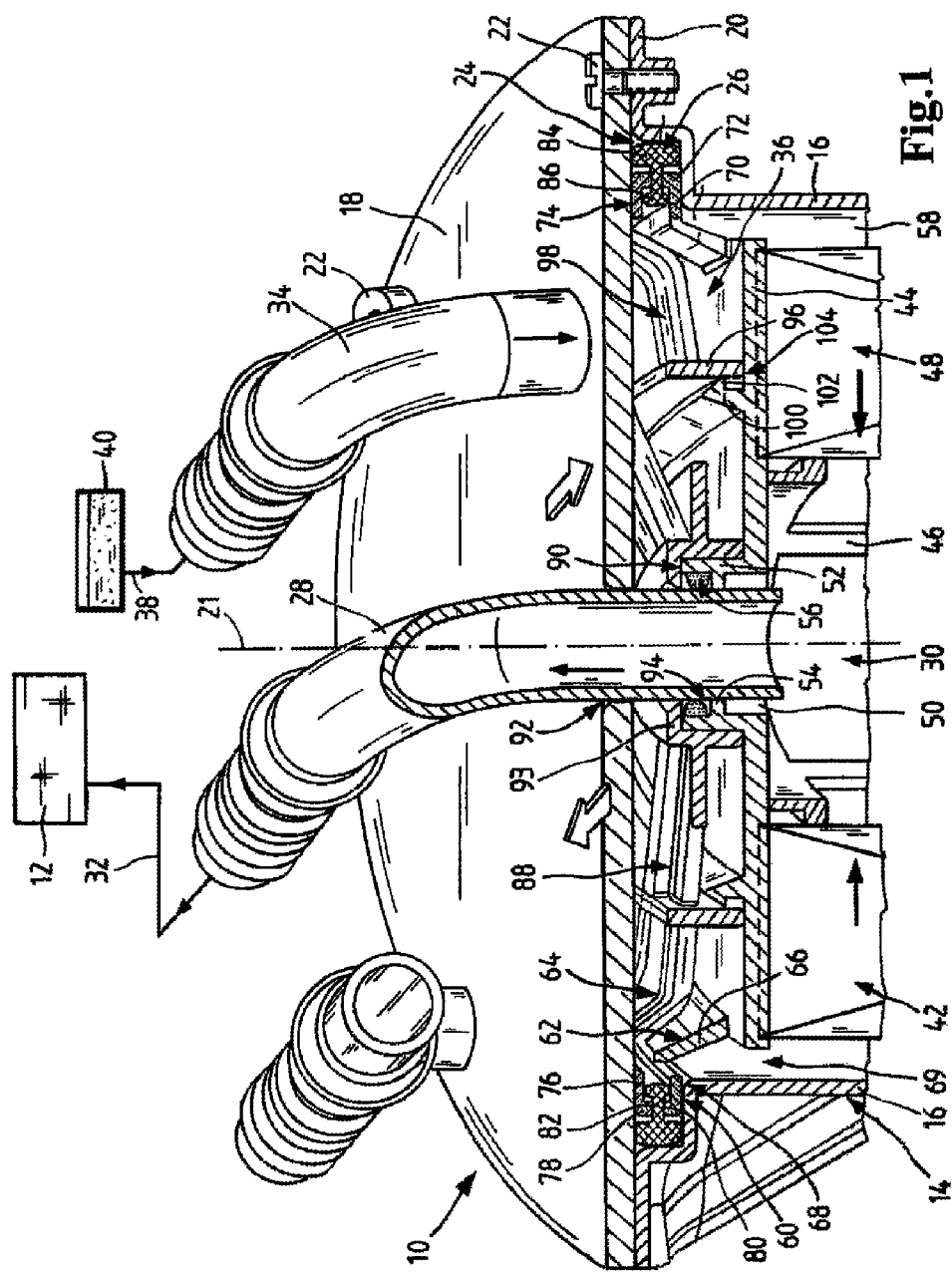
FIG. 1 shows schematically an isometric section view of a fuel filter of an internal combustion engine in the area of a housing cover wherein an annular seal of a filter element is clamped between the housing cover and a housing cup.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element and/or a liquid filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a detail of a fuel filter 10 of an internal combustion engine 12, shown only schematically, of a motor vehicle is illustrated. The fuel filter 10 comprises a two-part filter housing 14 that is assembled of a cup-shaped housing pot or housing cup 16 and a housing cover 18. The rim of the housing cup 16 that is facing the housing cover 18 is provided with several steps and forms a connecting flange area 20 that extends in radial direction outwardly. In this context and in the following description, the terms radial and axial refer to a virtual mounting axis 21 in which direction a filter element 42 is inserted into the filter housing 14 and removed from the housing 14. On the connecting flange area 20, the housing cover 18 is attached by means of screws 22 that are distributed uniformly in circumferential direction.

In radial direction, within the connecting flange area 20 the stepped rim of the housing cup 16 delimits a clamping area 24 for an outer radial annular seal 26. Coaxial to the mounting axis 21, an outlet tube 28 for filtered fuel passes through the housing cover 18 into an interior 30 of the filter housing 14 that constitutes the clean side of the filter. The outlet tube 28 is connected with the internal combustion engine 12 by means of a first fuel conduit 32.

An inlet tube 34 for the fuel to be filtered extends eccentrically and radially within clamping area 24 through the housing cover 18 into an annular inlet space 36 of the filter housing 14; this space 36 constitutes the raw (unfiltered) side. The inlet tube 34 is connected by means of a second fuel conduit 38 with a fuel tank 40. In the second fuel conduit 38 a fuel pump is arranged that is not illustrated and is of no interest with respect to the instant invention.

In the filter housing 14, the filter element 42 is arranged in such a way that it separates an opening of the inlet tube 34 from an opening of the outlet tube 28, i.e., the clean-side interior 30 from the raw-side inlet space 36.

Figure 2:
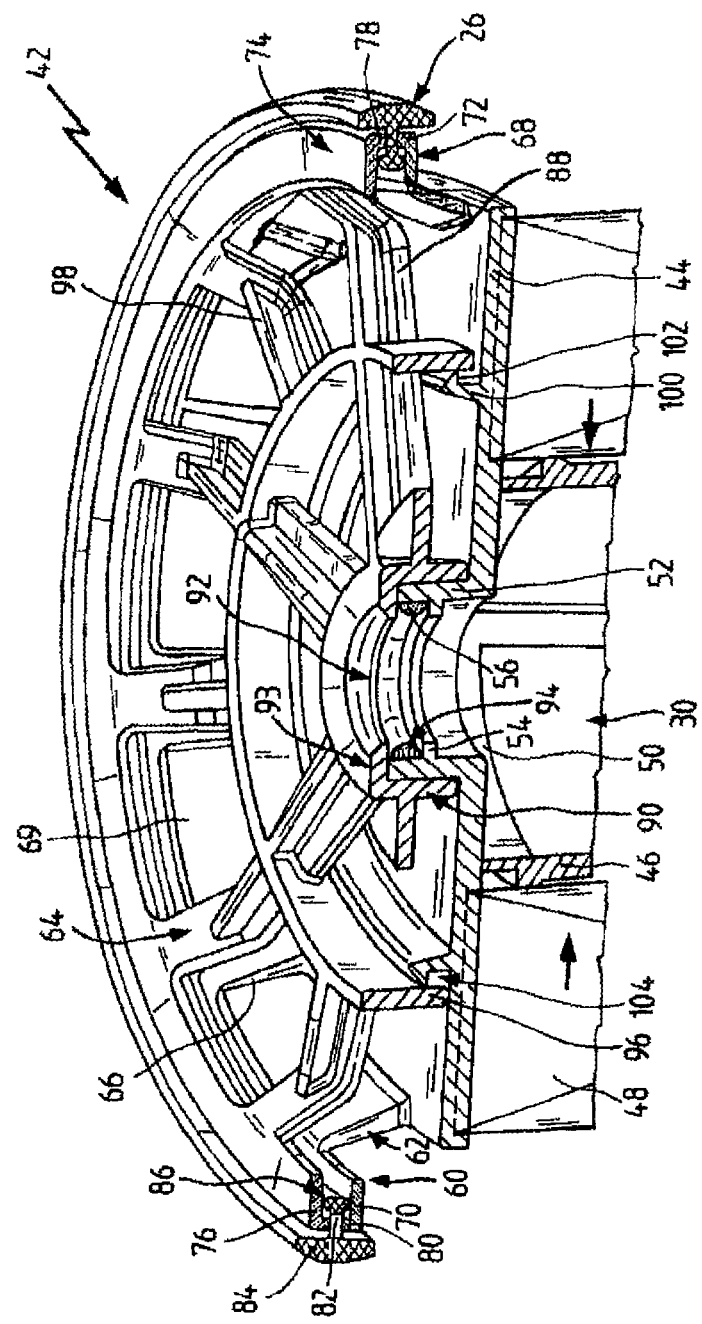
FIG. 2 shows schematically an isometric section view of the filter element of the fuel filter of FIG. 1 in the area of the annular seal.

The filter element 42 comprises, as shown in FIGS. 2 to 3, a first terminal disk 44 that is facing the housing cover 18, a second terminal disk that is not illustrated and that is facing the bottom, not illustrated, of the filter housing 10. A skeleton-like or grid-like central tube 46 extends between the first terminal disk 44 and the second terminal disk. The central tube 46 is surrounded by a filter medium 48 in the form of a filter bellows of zigzag-folded nonwoven. The central tube 46 delimits the interior 30 of the filter medium 48 at the clean side.

The terminal disk 44 has an outlet opening 50 that is concentric to the central tube 46. The outlet opening 50 is surrounded at the side that is facing the housing cover 18 with a hollow cylindrical connecting socket 52. The coaxial outlet tube 28 is inserted in the connecting socket 52.

On its inner radial circumferential side, the connecting socket 52 has a sealing step 54 extending inwardly in the radial direction. An O-ring seal 56 is resting on the sealing step 54 and is seal-tightly supported against the inner wall of the connecting socket 52 and against the outer wall of the outlet tube 28.

The filter medium 48 is surrounded by an annular inlet space 58 which is in communication with the inlet tube 34 by means of the raw-side inlet space 36. The filter medium 48 can be flowed through by the fuel to be filtered in radial direction from the exterior to the interior from the annular inlet space 58 to the interior 30.

The terminal disk 44 and also the filter element 42 are secured by the seal support 60 and the annular seal 26 in the filter housing 14.

The seal support 60 is of a two-part configuration and comprises a base member 62 and a cover member 64.

The base member 62 has a plurality of supports 66 by means of which a base member securing ring profile 68 is connected monolithically with the terminal disk 44. Connecting passages 69 are realized between the supports 66 and connect the inlet space 36 with the annular inlet space 58.

The base member securing ring profile 68 has an L-shaped profile. A base leg section 16 of the base member securing ring profile 68 extends approximately parallel to the terminal disk 44 and passes at its inner radial side into the supports 66. On the outer radial side of the base leg section 70 a base member securing section 72 adjoins. The base member securing section 72 extends axially relative to the mounting axis 21 and faces away from the terminal disk 44.

The cover member 64 has a cover member securing ring profile 74 that has also an L-shaped profile. A cover leg section 76 of the cover member securing ring 74 extends parallel to the base leg section 70 of the base member securing ring profile 68. In radial outward direction, the cover leg section 76 passes into a cover member securing section 78 that extends in axial direction toward the base member securing ring profile 68. Viewed In axial direction, the cover member securing section 78 is aligned with the base member securing section 72.

The free edges of the cover member securing section 78 and of the base member securing section 72 delimit a gap 80. In the gap 80, there is a securing section 82 of the annular seal 26. The base member securing section 72 and the cover member securing section 78 engage the securing section 82 like a pair of pliers in a pliers engagement.

The securing section 82 is located on the side of the annular seal 26 that is positioned in radial direction inwardly. It passes in radial direction outwardly into a sealing section 84 that is approximately of a half moon shape when viewed in profile. The extension of the sealing section 84 in axial direction is greater than the extension of the securing section 82 in radial direction. The sealing section 84 is located in radial direction outside of the base member securing section 72 and the cover member securing section 78. With its inner radial side, the sealing section 84 is positioned on both sides of the gap 80 against the base member securing section 72 and the cover member securing section 78. In radial direction inwardly of the pliers-type engagement of the base member securing section 72 and of the cover member securing section 78, the securing section 82 has a thicker portion 86 viewed in axial direction. The pliers-type engagement is located radially between the thicker portion 86 and the sealing section 84. The extension of the thicker section 86 in axial direction is significantly larger than the axial extension of the gap 80 and prevents that the annular seal 26 can slide in radial direction out of the pliers-type engagement.

In radial direction inward, the cover member securing ring profile 74 is formed monolithically with a plurality of connecting sections 88 that are arranged like spokes of a wheel. The connecting sections 88 extend to an inner radial fastening ring section 90 of the cover member 64 and are monolithically connected thereto. The fastening ring section 90 has approximately the shape of a cup whose open side is facing the terminal disk 44. At its bottom, the fastening ring section 90 has a through opening 92 through which the outlet tube 28 is extending. The fastening ring section 90 is pushed with its open side onto the connecting socket 52. An annular disk section 93 of the bottom of the fastening section 90 that surrounds the through opening 92 in radial direction outwardly projects past the connecting socket 52 in radial inward direction and forms in this way a boundary of a receptacle, in particular of a seal receptacle 94, for the O-ring seal 56. The seal receptacle 94 is moreover delimited by the seal ring step 54 and an inner radial circumferential wall of the connecting socket 52 that is extending between the seal ring step 54 and the annular disk section 93.

The cover member 64 has a hollow cylindrical support section 96 arranged in radial direction between the cover member securing ring profile 74 and the fastening ring section 90; this support section 96 is connected monolithically with the connecting sections 88. In circumferential direction between two of the connecting sections 88, respectively, a connecting intermediate section 98 extends from the support section 96 to the cover member securing ring profile 74. The support section 96 is resting with its rim against the exterior side of the terminal disk 44.

In radial direction inside of the support section 96, on the exterior side of the terminal disk 44 a hollow cylindrical looking hook ring 100 is formed. On the free edge of the looking hook ring 100 a circumferentially extending looking hook 102 is formed in radial outward direction. In the mounted state, the looking hook 102 engages the inner radial circumferential wall of the support section 96 so that a snap connection 104 between the cover member 64 and the terminal disk 44 is realized.

For assembly of the fuel filter 10, the terminal disk 44 together with the base member 62 is produced separate from the cover member 64.

The upper terminal disk 44 and the lower terminal disk are connected to the folded filter medium 48 and the central tube 46.

The annular seal 26 and the O-ring seal 56 are also produced separately. The O-ring seal 56 is inserted in axial direction from the exterior into the seal receptacle 94.

The annular seal 26 is inserted in axial direction into the base member securing ring profile 68 in such a way that the thicker portion 86 of the securing section 82 is located radially inside the base member securing section 72 and the sealing section 84 is positioned radially outside thereof.

Subsequently, the cover member 64 is mounted in axial direction on the base member 62 such that the open side of the fastening ring section 90 is leading. In this connection, the fastening ring section 90 is pushed onto the connecting socket 52 and the support section 96 onto the looking hook ring 100. The looking hook 102 engages the inner radial wall of the support section 96 so that the cover member 64 is attached to the terminal disk 44. The cover member securing section 78 of the cover member securing ring profile 74 engages in the axial direction the securing section 82 of the annular seal 26 so that the annular seal 26 is secured fixedly in the seal support 60 between the base member securing section 72 and the cover member securing section 78. The bottom of the fastening ring section 90 closes off the seal receptacle 94 so that the O-ring seal 46 is secured therein.

The filter element 42 is now inserted in axial direction into the housing cup 16 of the filter housing 14 until the side of the base member securing ring profile 68 and the side of the sealing section 84 of the annular seal 26 that are facing the terminal disk 44 are resting against the step of the clamping area 24 of the housing cup 16.

Now the housing cover 18 is mounted in axial direction on the housing cup 16 wherein the outlet tube 28 is inserted through the through opening 92 and the outlet opening 50. The O-ring seal 56 seals the outlet opening 50 relative to the outlet tube 28. The sealing section 84 of the annular seal 26 is clamped seal-tightly between the housing cover 18 and the step of the camping area 24 of the housing cup 16 whereby the sealing section 84 is elastically deformed.

The housing cover 18 is secured with screws 22 on the housing cup 16.

In the above described embodiment of a fuel filter 10 and of a filter element 42, the following modifications are possible inter alia.

The invention is not limited to fuel filters of internal combustion engines of motor vehicles. Instead, they can be used also in other types of liquid filters, for example, oil filters or water filters, also outside of automotive technology. The invention can also be used in connection with industrial motors.

Instead of the connecting sockets 88, other types of connection between the cover member securing ring profile 74 and the fastening ring section 90 can be provided also.

The seal support 60 can also be designed such that it supports only the outer radial annular seal 26. The inner O-ring seal 56 can be secured separately.

In addition to, or as alternative to, the snap connection 104 of the cover member 64 to the terminal disk 4, the cover member 64 can also have a corresponding fixation on the base member 62. The support section 96 can be comprised of separate segments instead of being of a circumferentially closed (continuous) structure.

Instead of the snap connection 104, it is also possible to employ a different kind of detachable or non-detachable connection to the terminal disk 44, for example, a rotation and/or insertion connection, in particular a screw connection or a bayonet-type connection, an adhesive connection or a weld connection.

The annular seal 26 can also have a different profile, for example, the thicker portion 86 can be eliminated.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter element for a liquid filter, the filter element configured to be arranged in a housing of the liquid filter that comprises at least two housing parts such that at least one inlet of the housing for liquid to be filtered is separated from at least one outlet of the housing for filtered liquid, the filter element comprising:
   a filter medium;
   at least one terminal disk that is connected to said filter medium;
   a outer radial annular seal;
   wherein said at least one terminal disk comprises a seal support for said outer radial annular seal that is to be clamped in a clamping area between the at least two housing parts that are separable from each other;
   wherein said seal support in an axial direction of the filter element comprises at least a base member and a cover member;
   wherein said base member is fixedly connected to said at least one terminal disk;
   wherein said cover member is attached to said at least one terminal disk, to said base member, or to said at least one terminal disk and said base member;
   wherein said annular seal is positioned between said base member and said cover member;
   wherein the base member of the seal support comprises:
     a base member securing ring spaced axially outwardly away from the at least one terminal disk, the base member securing ring profile including
       an annular radially outwardly extending base leg;
       a base member securing section formed on an outer radial portion of the base leg; and projecting axially outwardly away from the annular radially outwardly extending base leg towards said cover member;
     a plurality of support legs, a first end of said plurality of support legs secured onto said at least one terminal disk and an opposing second end of said plurality of support legs contacting and secured onto said securing profile ring;

wherein connecting fluid passages are realized between adjacent ones of the plurality of support legs for fluid flow between said plurality of support legs;

wherein the cover member of the seal support comprises:
a cover member securing ring profile including
an annular radially outwardly extending cover leg section arranged proximate to the annular radially outwardly extending base leg of the base member;
a cover member securing section formed on an outer radial portion of and projecting axially away from the radially outwardly extending cover leg section;
wherein said sealing area includes an annular gap defined by axial spacing between the base member securing section and the cover member securing section;
wherein a portion of said annular seal extends through said annular gap, wherein said base member securing section and the cover member securing section cooperate to compress said portion of said annular seal within said annular gap with a pliers-type engagement.

2. The filter element according to claim 1, wherein said cover member further comprises
connecting sections and
an inner radial fastening ring section,
wherein said connecting sections connect said cover member securing ring profile to said fastening ring section and are arranged in a spoke arrangement in a radial direction,
wherein said fastening ring section is attached to said at least one terminal disk, to said base member, or to said at least one terminal disk and said base member.

3. The filter element according to claim 2, wherein said cover member comprises
at least one support section supporting said connecting sections relative to said at least one terminal disk;
wherein said at least one support section is positioned between said cover member securing ring profile and said fastening ring section.

4. The filter element according to claim 3, wherein said support section is annular.

5. The filter element according to claim 1, wherein said cover member forms at least partially a receptacle for an inner radial annular seal.

6. The filter element according to claim 2, wherein said fastening ring section of said cover member forms at least partially a receptacle for said inner radial annular seal.

7. The filter element according to claim 1, wherein
said cover member is connected by a connection selected from the group consisting of a snap connection, a rotation and/or insertion connection, a screw connection, a bayonet connection, an adhesive connection, and a weld connection to said at least one terminal disk, to said base member, or to said at least one terminal disk and said base member.

8. A liquid filter comprising:
a housing comprising
at least two housing parts that are separable from each other;
at least one inlet for liquid to be filtered; and
at least one outlet for filtered liquid;
a filter element arranged within said housing in such a way that said at least one inlet is separated from said at least one outlet, said filter element comprising
a filter medium;
at least one terminal disk that is connected to said filter medium; and
an outer radial annular seal;
wherein said at least one terminal disk comprises a seal support for said outer radial annular seal to be clamped in a clamping area between said at least two housing parts;
wherein said seal support in an axial direction of said filter element comprises at least a base member and a cover member;
wherein said base member is fixedly connected to said at least one terminal disk;
wherein said cover member is attached to said at least one terminal disk, to said base member, or to said at least one terminal disk and said base member;
wherein said outer radial annular seal is positioned between said base member and said cover member;
wherein the base member of the seal support comprises:
a base member securing ring spaced axially outwardly away from the at least one terminal disk, the base member securing ring profile including
an annular radially outwardly extending base leg;
a base member securing section formed on an outer radial portion of the base leg; and projecting axially outwardly away from the annular radially outwardly extending base leg towards said cover member;
a plurality of support legs, a first end of said support legs secured onto said at least one terminal disk and an opposing second end of said support legs contacting and secured onto said securing profile ring;
wherein connecting fluid passages are realized between adjacent ones of the plurality of support legs for fluid flow between said plurality of support legs;
wherein the cover member of the seal support comprises:
a cover member securing ring profile including
an annular radially outwardly extending cover leg section arranged proximate to the annular radially outwardly extending base leg of the base member;
a cover member securing section formed on an outer radial portion of and projecting axially away from the radially outwardly extending cover leg section;
wherein an annular gap is defined by axial spacing between the base member securing section and the cover member securing section;
wherein a portion of said annular seal extends through said annular gap, wherein said base member securing section and the cover member securing section cooperate to compress said portion of said annular seal within said annular gap with a pliers-type engagement.

* * * * *